UNITED STATES PATENT OFFICE.

EMIL MÜLLER, OF BASEL, SWITZERLAND, ASSIGNOR TO THE HOFFMANN-LA ROCHE CHEMICAL WORKS, OF NEW YORK, N. Y., A CORPORATION OF NEW YORK.

HOMOLOGUE OF TROPIN AND THE PROCESS OF PRODUCING SAME.

1,352,082.   Specification of Letters Patent.   Patented Sept. 7, 1920.

No Drawing.   Application filed December 16, 1916. Serial No. 137,381.

*To all whom it may concern:*

Be it known that I, EMIL MÜLLER, a citizen of Switzerland, and a resident of Basel, Switzerland, have invented a certain new and useful Homologue of Tropin and the Process of Producing Same, of which the following is a specification.

My invention relates in general to homologues of tropin and in particular to that homologue which has the formula $C_9H_{17}NO$ and which I term homotropin. Tropin ($C_8H_{15}NO$) has the following graphic formula:

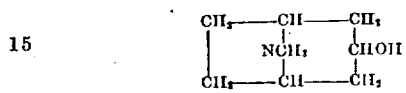

Homologues of tropin have heretofore never been recognized. I have discovered that by treating dihydroanhydroecgoninalkyl ester with sodium in a solution of absolute alcohol, I obtain homotropin $C_9H_{17}NO$ having the following graphic formula:

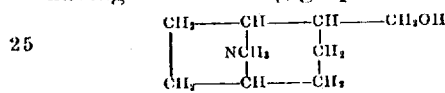

Homotropin is difficultly soluble in petroleum ether; easily soluble in ether, benzol, alcohol or water. It crystallizes from ligroin in long needles which melt at 85° C. The homotropin hydrochlorid melts at 210° C. and is soluble in water or alcohol, and insoluble in ether. The platinum compound is very soluble in water, the gold compound and the picrate are difficultly soluble. Homotropin rotates the plane of polarized light to the right; thus the plane of polarization will be turned to $/\alpha /_{19}^{D} = 22.51$.

Example.

Anhydroecgonin is treated with sodium and amylic alcohol, according to Willstätter (*Berichte der Deutschen Chemischen Gesellschaft*, 30/1897, pps. 711 and 714); or is catalytically reduced, according to Paal or Skita; or is electrolytically reduced in weak acid solution to dihydroanhydroecgonin. The reaction which takes place may be illustrated as follows:

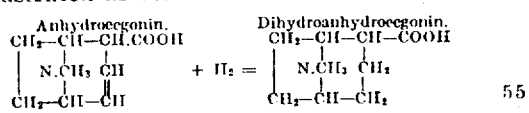

The resultant substance is then dissolved in 8 parts absolute alcohol; dry hydrochloric acid is then added at a boiling temperature to the solution, and the alcohol evaporated. To the sediment formed is added a small quantity of water and the ester is then freed by means of potassium carbonate. The ester is dissolved in ether, dried, distilled and fractionized. Its boiling point is 128–131° at 17mm.

10 parts dihydroanhydroecgoninethylester, dissolved in 150 parts absolute alcohol, and at boiling temperature, is reduced by 24 parts sodium. The carboxyl group is thereby reduced to a primary alcohol group in accordance with the following equation:

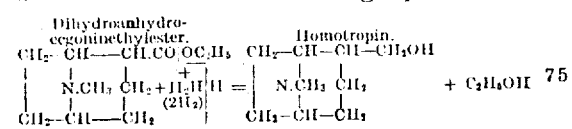

The solution is then acidified with concentrated hydrochloric acid and the alcohol evaporated; the acidulous solution remaining is then neutralized with potassium hydroxid and the homotropin produced is washed out with ether. The ether solution is then dried with potassium hydroxid and the ether distilled off. A yellow oil is obtained which after a time becomes stable and, by dissolving in ligroin and decrystallizing, a pure homotropin with a melting point of 85° is obtained.

It is to be understood that I do not limit myself to the precise details set forth but that variations may be made without departing from my invention as set forth in the appended claims.

I claim:

1. A homologue of tropin which may be formed by treating dihydroanhydroecgoninalkyl ester with sodium in a solution of absolute alcohol and is difficultly soluble in petroleum ether and easily soluble in ether, benzol, alcohol or water, which crystallizes from ligroin in long needles which melt at 85° C. and rotates the plane of polarized light to the right, whose hydrochlorid melts at 210° C. and is soluble in water and alcohol and insoluble in ether, and whose platinum compound and picrate are difficultly soluble in water.

2. The process of producing homotropin comprising treating dihydroanhydroecgoninalkyl ester with a reducing agent in a solution of absolute alcohol.

3. The process of producing homotropin comprising treating dihydroanhydroecgoninethyl ester with sodium in a solution of absolute alcohol.

In testimony whereof I have hereunto set my hand.

EMIL MÜLLER.